(12) United States Patent
Fukui et al.

(10) Patent No.: US 9,950,508 B2
(45) Date of Patent: Apr. 24, 2018

(54) ELECTROSTATIC SCREEN PRINTER

(71) Applicant: HITACHI ZOSEN CORPORATION, Osaka (JP)

(72) Inventors: Hideyuki Fukui, Osaka (JP); Kenji Okamoto, Osaka (JP); Yasushi Takano, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 0 days.

(21) Appl. No.: 15/323,531

(22) PCT Filed: Jun. 26, 2015

(86) PCT No.: PCT/JP2015/068453
§ 371 (c)(1),
(2) Date: Jan. 3, 2017

(87) PCT Pub. No.: WO2016/002642
PCT Pub. Date: Jan. 7, 2016

(65) Prior Publication Data
US 2017/0144429 A1    May 25, 2017

(30) Foreign Application Priority Data

Jul. 4, 2014 (JP) ................................. 2014-138198

(51) Int. Cl.
*B41F 15/08* (2006.01)
*B41F 15/26* (2006.01)
(Continued)

(52) U.S. Cl.
CPC .............. *B41F 15/12* (2013.01); *B41F 15/36* (2013.01); *B41F 15/44* (2013.01); *B41M 1/42* (2013.01); *B41P 2215/50* (2013.01)

(58) Field of Classification Search
CPC ........ B41F 15/08; B41F 15/088; B41F 15/12; B41F 15/36; B41F 15/44; B41J 2/415;
(Continued)

(56) References Cited

U.S. PATENT DOCUMENTS

| 6,789,471 | B2 * | 9/2004 | Zimmer | ................ G03G 15/16 |
| | | | | 101/41 |
| 2003/0026899 | A1 | 2/2003 | Morita et al. | |
| 2003/0066572 | A1 | 4/2003 | Sakaida et al. | |

FOREIGN PATENT DOCUMENTS

| EP | 1410908 A1 | 4/2004 |
| JP | 2002-11845 | 1/2002 |

(Continued)

OTHER PUBLICATIONS

International Search Report dated Jul. 21, 2015 for Appln. No. PCT/JP2015/068453.

(Continued)

*Primary Examiner* — Leslie J Evanisko
*Assistant Examiner* — Marissa Ferguson Samreth
(74) *Attorney, Agent, or Firm* — Pillsbury Winthrop Shaw Pittman, LLP

(57) ABSTRACT

An electrostatic screen printer includes: an electrically conductive screen arranged in non-contact with a printing medium; sponges for rubbing a powder into the screen; and a direct current power source for applying a voltage to the printing medium and the powder, wherein the powder rubbed into the screen is adhered to the printing medium by electrostatic induction. The electrostatic screen printer includes a rotation mechanism for rotating the sponges, a parent revolution mechanism for parent revolution of the sponges, and a child revolution mechanism for child revolution of the sponges. The revolution speed ratio of the child revolution to the parent revolution may preferably be 4.0 or greater, a scraper is provided on the parent revolution (Continued)

mechanism so as to be interlocked with the revolution of the sponges, and the scraper is arranged so as to scrape the powder on the screen toward an axis of the parent revolution because of the interlocking.

9 Claims, 23 Drawing Sheets

(51) Int. Cl.
*B41F 15/12* (2006.01)
*B41F 15/44* (2006.01)
*B41F 15/36* (2006.01)
*B41M 1/42* (2006.01)

(58) Field of Classification Search
CPC .......... B41J 2/4155; B41M 1/25; B41M 1/30; B41M 1/42; G03G 17/00; B41P 2215/50
See application file for complete search history.

(56) References Cited

FOREIGN PATENT DOCUMENTS

| | | | | |
|---|---|---|---|---|
| JP | 2003-46234 | | 2/2003 | |
| JP | 2003-182023 | | 7/2003 | |
| JP | 2008-023949 | * | 2/2008 | .............. B41F 15/08 |
| JP | 2010-207780 | * | 9/2010 | .............. B05C 19/04 |
| JP | 2011-243402 | | 12/2011 | |
| JP | 2012-140016 | | 7/2012 | |
| JP | 2014-61703 | | 4/2014 | |
| JP | 2014-065181 A | | 4/2014 | |
| JP | 2014-208405 | * | 11/2014 | .............. B41F 15/08 |

OTHER PUBLICATIONS

Extended European Search Report EP Application No. 15815844.4 dated Oct. 9, 2017.

* cited by examiner

Comparative Example

[μm]

| 80 | 83 | 84 | 83 | 70 |
|---|---|---|---|---|
| 150 | 155 | 145 | 123 | 113 |
| 190 | 225 | 190 | 168 | 150 |
| 180 | 185 | 183 | 168 | 140 |
| 108 | 130 | 123 | 135 | 100 |

Fig. 6

Example 1

[μm]

| 90 | 97.5 | 97.5 | 97.5 | 95 |
|---|---|---|---|---|
| 97.5 | 110 | 120 | 118 | 108 |
| 103 | 113 | 130 | 120 | 110 |
| 95 | 103 | 110 | 115 | 100 |
| 92.5 | 100 | 100 | 95 | 95 |

Fig. 7

Example 2

[μm]

| 95 | 92.5 | 100 | 97.5 | 90 |
|---|---|---|---|---|
| 110 | 120 | 130 | 115 | 103 |
| 108 | 125 | 135 | 120 | 105 |
| 103 | 110 | 125 | 118 | 110 |
| 97.5 | 100 | 100 | 95 | 92.5 |

Fig. 8

Example 3

[μm]

| 75 | 87.5 | 92.5 | 85 | 75 |
|---|---|---|---|---|
| 72.5 | 92.5 | 103 | 100 | 100 |
| 97.5 | 115 | 133 | 115 | 97.5 |
| 92.5 | 100 | 105 | 100 | 90 |
| 95 | 87.5 | 80 | 80 | 90 |

Fig. 9

Example 4

[μm]

| 95 | 92.5 | 92.5 | 90 | 85 |
|---|---|---|---|---|
| 103 | 110 | 115 | 110 | 100 |
| 108 | 118 | 128 | 125 | 110 |
| 105 | 118 | 120 | 125 | 105 |
| 100 | 113 | 100 | 95 | 105 |

Fig. 10

Example 5

| [μm] | | | | |
|---|---|---|---|---|
| 80 | 80 | 80 | 80 | 90 |
| 80 | 82.5 | 90 | 97.5 | 92.5 |
| 90 | 95 | 125 | 100 | 95 |
| 80 | 87.5 | 100 | 95 | 90 |
| 80 | 82.5 | 97.5 | 90 | 95 |

Fig. 11

ELECTROSTATIC SCREEN PRINTER

CROSS-REFERENCE TO RELATED APPLICATIONS

This is the U.S. National Stage of PCT/JP2015/068453, filed Jun. 26, 2015, which in turn claims priority to Japanese Application No. 2014-138198, filed Jul. 4, 2014, the entire contents of all applications are incorporated herein by reference in their entireties.

TECHNICAL FIELD

The present invention relates to an electrostatic screen printer.

BACKGROUND

Electrostatic screen printing is widely used for fragile printing media (such as food) because in electrostatic screen printing, a printing medium on which to adhere or deposit printing powder is not pressed. In recent years, there has been an increasing demand for all-solid secondary batteries with the development of electronic instruments, and it has been proposed to use electrostatic screen printing to form a powder layer in all-solid secondary batteries (see, e.g., Patent Literature 1).

All-solid secondary batteries need to have a powder layer having a strictly even thickness. However, in the method of Patent Literature 1, the thickness of the powder layer (such as an electrode layer or an electrolyte layer) is not more even than in conventional electrostatic screen printing.

By contrast, there has been provided an electrostatic screen printer that can uniform the thickness of the powder adhered and deposited on a printing medium (e.g., Patent Literature 2). In the electrostatic screen printer described in Patent Literature 2, a powder is rubbed into a screen with a roller, thereby adhering the powder to the printing medium somewhat evenly.

RELEVANT REFERENCES

Patent Literature

Patent Literature 1: Japanese Patent Application Publication No. 2012-140016
Patent Literature 2: Japanese Patent Application Publication No. 2011-243402

SUMMARY

However, even with the electrostatic screen printer described in Patent Literature 2, when the amount of powder placed on the screen is uneven in the axial direction of the roller, the powder is unevenly rubbed into the screen. Therefore, in this case, there is a problem that the powder unevenly adheres to the printing medium.

An object of the present invention is to provide an electrostatic screen printer that can adhere a powder to a printing medium more evenly.

Solution to Problem

To address the above problem, an electrostatic screen printer according to a first aspect comprises: an electrically conductive screen arranged in non-contact with a printing medium; at least one rubbing member configured to rub a powder into the screen; and a direct current power source configured to apply a voltage to the printing medium and the powder, wherein the powder rubbed into the screen is adhered to the printing medium by electrostatic induction, and wherein the electrostatic screen printer includes a rotation mechanism configured to rotate the at least one rubbing member and a revolution mechanism configured to revolve the at least one rubbing member.

The electrostatic screen printer according to a second aspect is fabricated by configuring the electrostatic screen printer according to the first aspect such that a scraper is provided on the revolution mechanism so as to be interlocked with the revolution of the at least one rubbing member, and the scraper is arranged so as to scrape the powder on the screen toward an axis of the revolution because of the interlocking.

The electrostatic screen printer according to a third aspect is fabricated by configuring the electrostatic screen printer according to the first or second aspect such that the at least one rubbing member comprises a plurality of rubbing members, and the distance from an axis of the revolution of the plurality of rubbing members to an axis of the rotation of each of the plurality of rubbing members is different.

The electrostatic screen printer according to a fourth aspect is fabricated by configuring the electrostatic screen printer according to the first or second aspect such that the revolution of the at least one rubbing member includes two stages, i.e., parent revolution and child revolution, and a revolution speed ratio of the child revolution to the parent revolution is 4.0 or greater.

The electrostatic screen printer according to a fifth aspect is fabricated by configuring the electrostatic screen printer according to the first or second aspect such that the rotation mechanism is configured to rotate the at least one rubbing member in a direction opposite to a direction of the revolution.

The electrostatic screen printer according to a sixth aspect is fabricated by configuring the electrostatic screen printer according to the second aspect so as to further include a powder feeding unit configured to feed to the scraper the powder to be rubbed into the screen.

The electrostatic screen printer according to a seventh aspect is fabricated by configuring the electrostatic screen printer according to the third aspect such that the plurality of rubbing members are configured to rotate such that trajectories of contact surfaces thereof with the screen overlap with each other, and rotate so as not to contact with each other.

The electrostatic screen printer according to an eighth aspect is fabricated by configuring the electrostatic screen printer according to the first or second aspect such that the at least one rubbing member includes an elastic member and a wear-resistant layer covering the elastic member and capable of contacting with the screen.

The electrostatic screen printer according to a ninth aspect is fabricated by configuring the electrostatic screen printer according to the first or second aspect so as to further include a screen vibrating unit configured to vibrate the screen.

Advantages

The above electrostatic screen printer can adhere a powder to a printing medium more evenly.

BRIEF DESCRIPTION OF THE DRAWINGS

FIG. 6 shows measurement results of film thicknesses in Comparative Example compared to Examples 1 to 5 of the electrostatic screen printer.

FIG. 7 shows measurement results of film thicknesses in Example 1 of the electrostatic screen printer.

FIG. 8 shows measurement results of film thicknesses in Example 2 of the electrostatic screen printer.

FIG. 9 shows measurement results of film thicknesses in Example 3 of the electrostatic screen printer.

FIG. 10 shows measurement results of film thicknesses in Example 4 of the electrostatic screen printer.

FIG. 11 shows measurement results of film thicknesses in Example 5 of the electrostatic screen printer.

DESCRIPTION OF EMBODIMENTS

Embodiment 1

An electrostatic screen printer according to Embodiment 1 of the present invention will now be described.

First, an outline of conventional electrostatic screen printing will be described with reference to FIG. 1.

Figure 1:
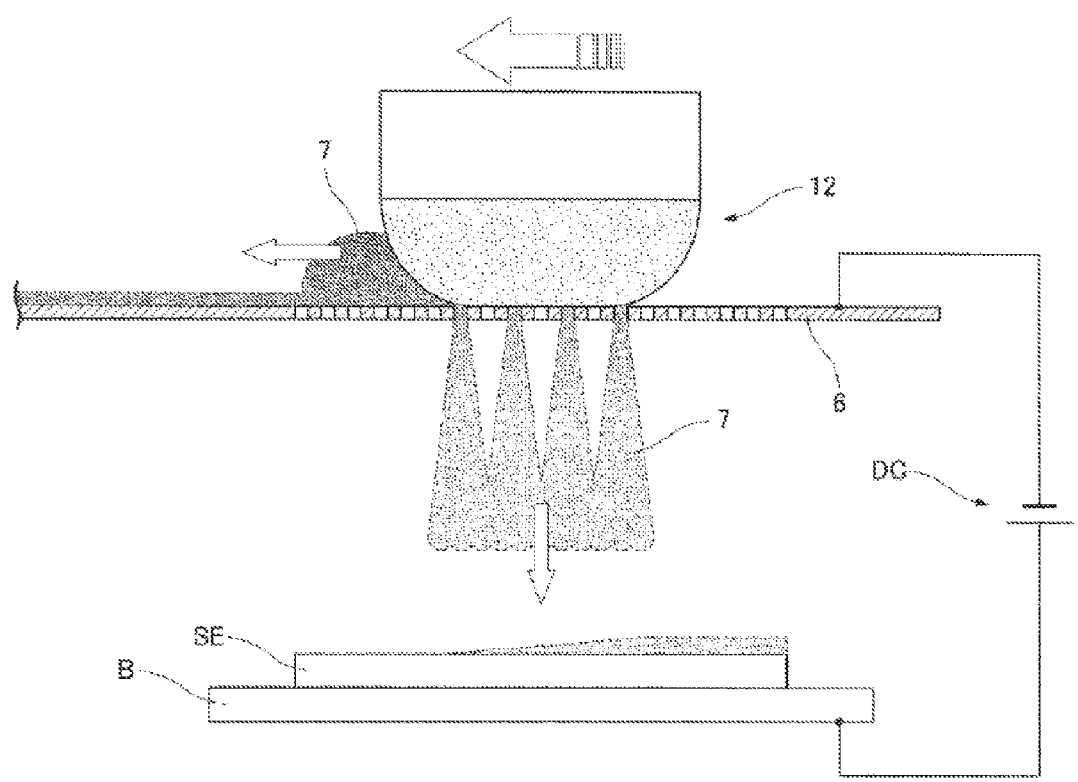
FIG. 1 is a schematic view for explaining conventional electrostatic screen printing.

In conventional electrostatic screen printing, as shown in FIG. 1, a powder 7 is rubbed by a sponge 12 into a screen 6 including a mesh net connected to the negative electrode of a direct current power source DC, thereby to charge the powder 7 and pass the powder 7 through the screen 6. Then, the charged powder 7 adheres to the printing medium SE by electrostatic induction. The printing medium SE is connected to the positive electrode of the direct current power source DC via the pedestal B.

The electrostatic screen printer of the present invention performs the above-described electrostatic screen printing with improved arrangement and movement (rubbing method) of the sponge 12 that enables the powder 7 to be adhered to the printing medium SE to an extreme evenness.

Next, the electrostatic screen printer according to Embodiment 1 of the present invention will now be described with reference to the drawings. In the following description, "rotation" involves an axis thereof located inside the rotating object, whereas "revolution" involves an axis thereof located outside the revolving object.

Figure 2A:
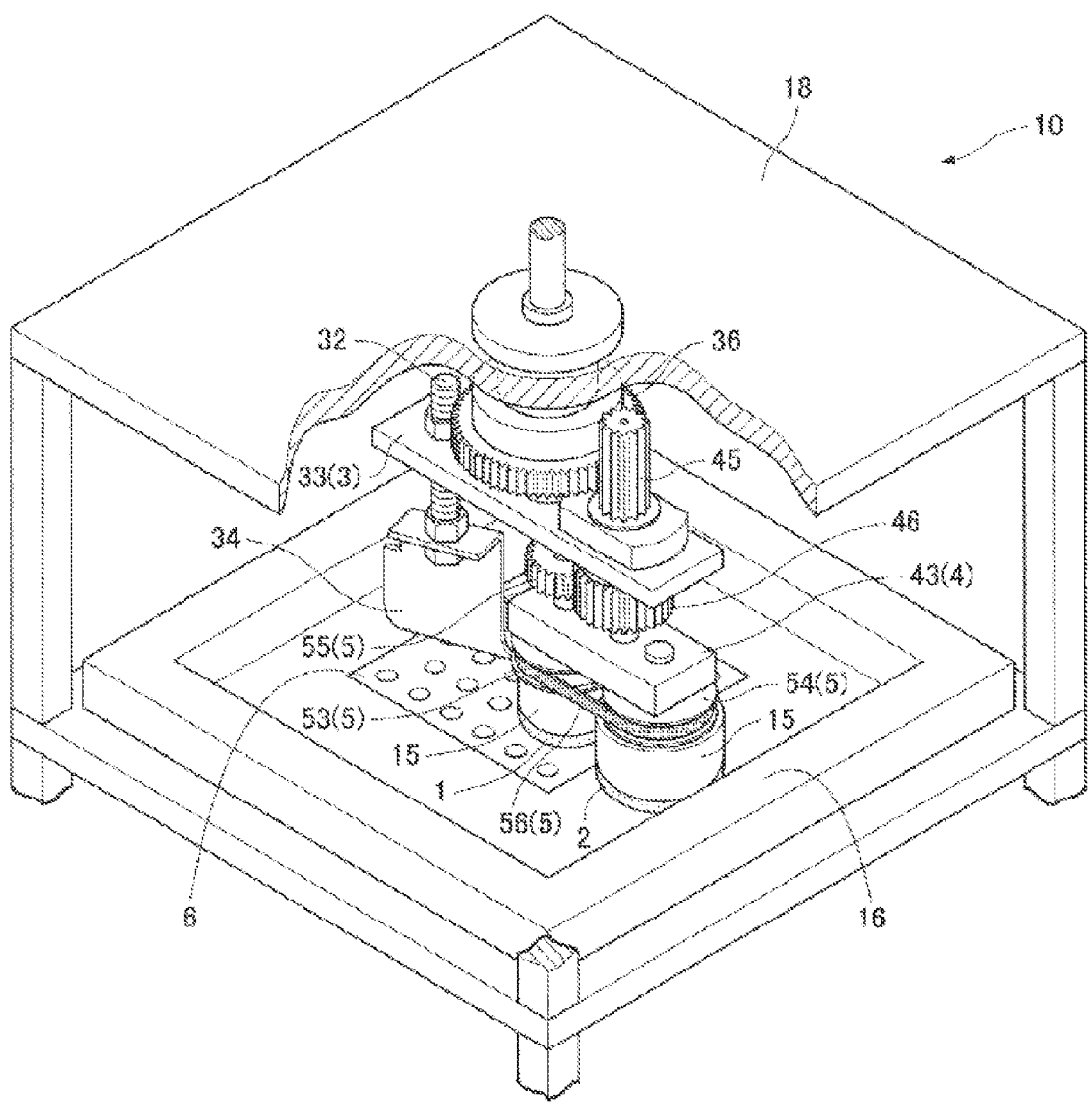
FIG. 2a is a perspective view of an electrostatic screen printer according to Embodiment 1 of the present invention.
Figure 2B:
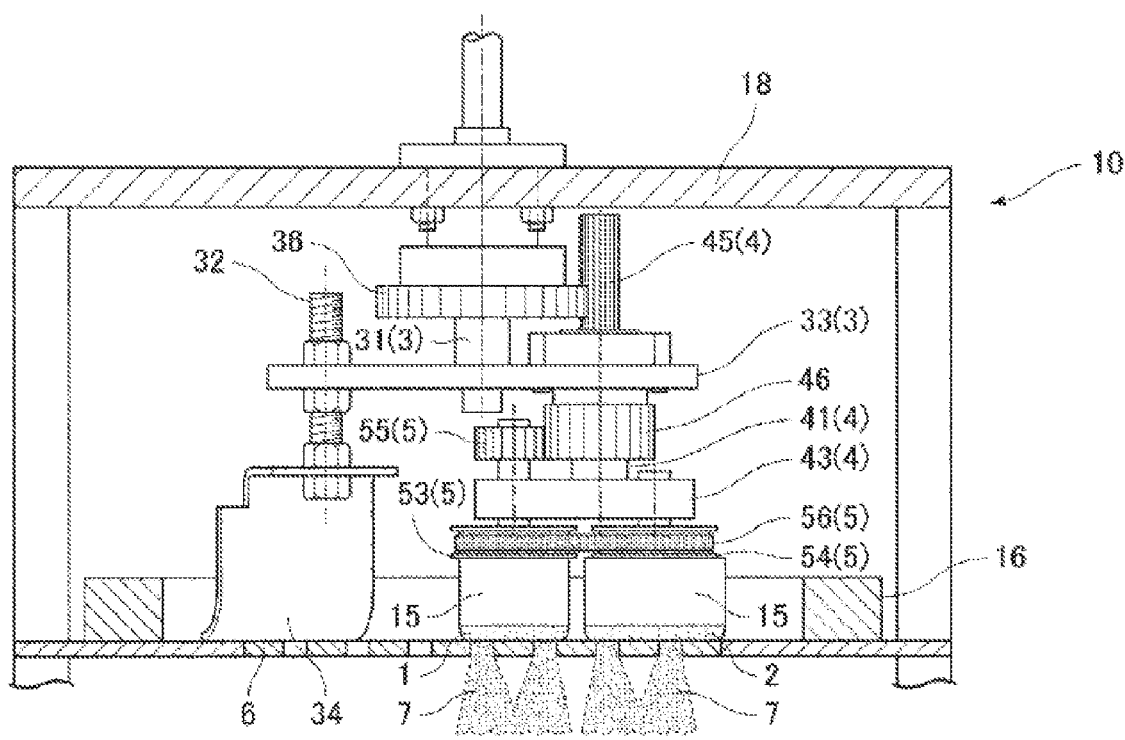
FIG. 2b is a sectional view of the same.
Figure 3:
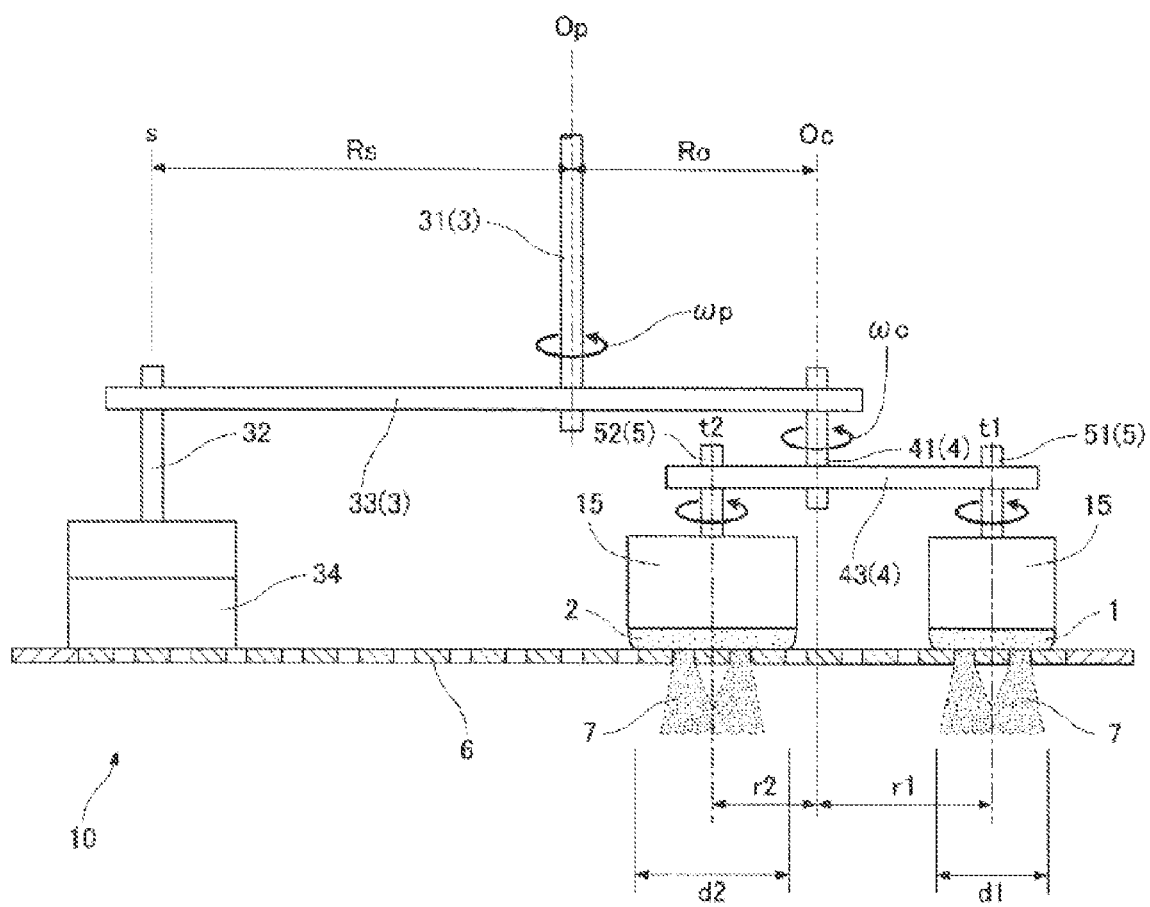
FIG. 3 is a schematic view of the electrostatic screen printer.

As shown in FIGS. 2a, 2b, and 3, the electrostatic screen printer includes a screen 6 through which the powder 7 is to be passed, and sponges 1 and 2 (an example of rubbing members) for rubbing the powder 7 into the screen 6. As shown in FIG. 3, these two sponges 1, 2 rotate and revolve around axes t1, t2, Op, Oc that are orthogonal to the screen 6, such that the powder 7 is rubbed into the screen 6 to an extreme evenness. That is, the electrostatic screen printer 10 includes a rotation mechanism 5 for rotating the two sponges 1 and 2, a parent revolution mechanism 3 for revolving the sponges 1 and 2 (at a revolution speed ωp), and a child revolution mechanism 4 for further revolving the sponges 1 and 2 (at a revolution speed ωc). Although not shown, the electrostatic screen printer 10 further includes a pedestal disposed below the screen 6 and configured to carry a printing medium, and a direct current power supply for electrically connecting the screen 6 and the pedestal. As in the conventional electrostatic screen printing shown in FIG. 1, the direct current power source applies a negative voltage to the powder 7 via the screen 6, and also applies a positive voltage to the printing medium via the pedestal. In the following description, the revolution caused by the parent revolution mechanism 3 (at a revolution speed ωp) will be referred to as "parent revolution," and the revolution caused by the child revolution mechanism 4 (at a revolution speed ωc) will be referred to as "child revolution." These two revolutions, the parent revolution and the child revolution, will be simply referred to as "revolutions."

As shown in FIGS. 2a, 2b, and 3, the screen 6 is disposed horizontally and included a mesh net, and when the powder 7 placed on the upper surface of the screen 6 is rubbed in, the screen 6 passes the powder 7 to the lower surface thereof. The screen 6 is made of an electrically conductive material and charges the powder 7 to be passed through by applying a high voltage from the direct current power supply. Furthermore, as in the conventional electrostatic screen printing shown in FIG. 1, the screen 6 is essentially arranged so as not to contact with the printing medium. As shown in FIGS. 2a and 2b, a screen frame 16 is arranged on the periphery of the screen 6.

The sponges 1, 2 are made of a material advantageous for rubbing the powder 7 into the screen 6 and charging the powder 7. Examples of such materials include polyurethane, nylon or the like made elastic (for example, spongy). In addition, the two sponges 1, 2 may preferably have different sizes in order to rub the powder 7 evenly into the screen 6. In the following description, the smaller one of these two sponges 1, 2 will be referred to as "a first sponge 1" and the larger one as "a second sponge 2".

The rotation mechanism 5 include a first rotation shaft 51 providing the rotation axis t1 of the first sponge 1, a first rotation pulley 53 (not shown in FIG. 3) connected to the first rotation shaft 51 on the screen 6 side, a second rotation shaft 52 providing the rotation axis t2 of the second sponge 2, and a second rotation pulley 54 (not shown in FIG. 3) connected to the second rotation shaft 52 on the screen 6 side. On the screen 6 side of the first rotation pulley 53 and the second rotation pulley 54, there are provided cylindrical bodies 15 for supporting the first sponge 1 and the second sponge 2. Further, as shown in FIGS. 2a and 2b, the rotation mechanism 5 includes a rotation drive unit 55 connected to one of the first rotation shaft 51 and the second rotation shaft 52 (the first rotation shaft 51 in FIGS. 2a and 2b), and a power transmission unit 56 that transmits the driving force of the rotation drive unit 55 to the other of the first rotation shaft 51 and the second rotation shaft 52 (the second rotation shaft 52 in FIGS. 2*a* and 2*b*).

As shown in FIGS. 2*a*, 2*b*, and 3, the parent revolution mechanism 3 includes a parent revolution shaft 31 providing the parent revolution axis Op, a parent revolution arm 33 connected to the parent revolution shaft 31 on the screen 6 side so as to be parallel with the screen 6, and a parent revolution drive unit (not shown) disposed on the top plate 18 shown in FIGS. 2*a* and 2*b* and connected to the parent revolution shaft 31. On one end of the parent revolution arm 33, there are provided a rod 32 (e.g., a stud bolt) and a scraper 34. The rod 32 is arranged toward the screen 6, and the scraper 34 is arranged such that the upper end thereof is fixed on the rod 32 on the screen 6 side and the lower edge thereof contacts with the screen 6.

As shown in FIGS. 2*a*, 2*b*, and 3, the child revolution mechanism 4 includes a child revolution shaft 41 disposed on the other end of the parent revolution arm 33 and providing the child revolution axis Oc, a child revolution arm 43 connected to the child revolution shaft 41 on the screen 6 side so as to be parallel with the screen 6, and a child revolution drive unit 45 (not shown in FIG. 3) connected to the child revolution shaft 41. On both ends of the child revolution arm 43, there are provided the first rotation shaft 51 and the second rotation shaft 52, respectively.

The parent revolution drive unit, which is connected to the upper end of the parent revolution shaft 31 and thus is not shown, is constituted by, for example, an electric motor and configured to drive the parent revolution shaft 31. As shown in FIGS. 2*a* and 2*b*, the child revolution drive unit 45 is, for example, a child revolution gear 45 configured to mesh with a non-rotating spur gear 36 provided on the parent revolution shaft 31. The spur gear 36 on the parent revolution shaft 31 and the child revolution gear 45 meshing therewith interlock the child revolution with the parent revolution in the forward direction. The rotation drive unit 55 is, for example, a rotation gear 55 configured to mesh with a non-rotating spur gear 46 provided on the child revolution shaft 41. The spur gear 46 on the child revolution shaft 41 and the rotation gear 55 meshing therewith interlock the rotation with the child revolution in the forward direction. The power transmission unit 56 is, for example, a timing belt 56 stretched around the first rotation pulley 53 and the second rotation pulley 54. The timing belt 56 interlock the rotation of one of the first sponge 1 and the second sponge 2 with the other in the forward direction.

In the configuration of the electrostatic screen printer 10 as shown in FIG. 3, the distance between the parent revolution axis Op and the child revolution axis Oc is referred to as "sponge parent revolution radius Ro," the distance between the parent revolution axis Op and the axis s of the rod 32 is referred to as "scraper parent revolution radius Rs," the distance between the child revolution axis Oc and the rotation axis t1 of the first sponge 1 is referred to as "first child revolution radius r1," the distance between the child revolution axis Oc and the rotation axis t2 of the second sponge 2 is referred to as "second child revolution radius r2," the diameter of the contact surface (having a circular shape) between the first sponge 1 and the screen 6 is referred to as "first contact diameter d1," and the diameter of the contact surface (having a circular shape) between the second sponge 2 and the screen 6 is referred to as "second contact diameter d2."

Figure 4:
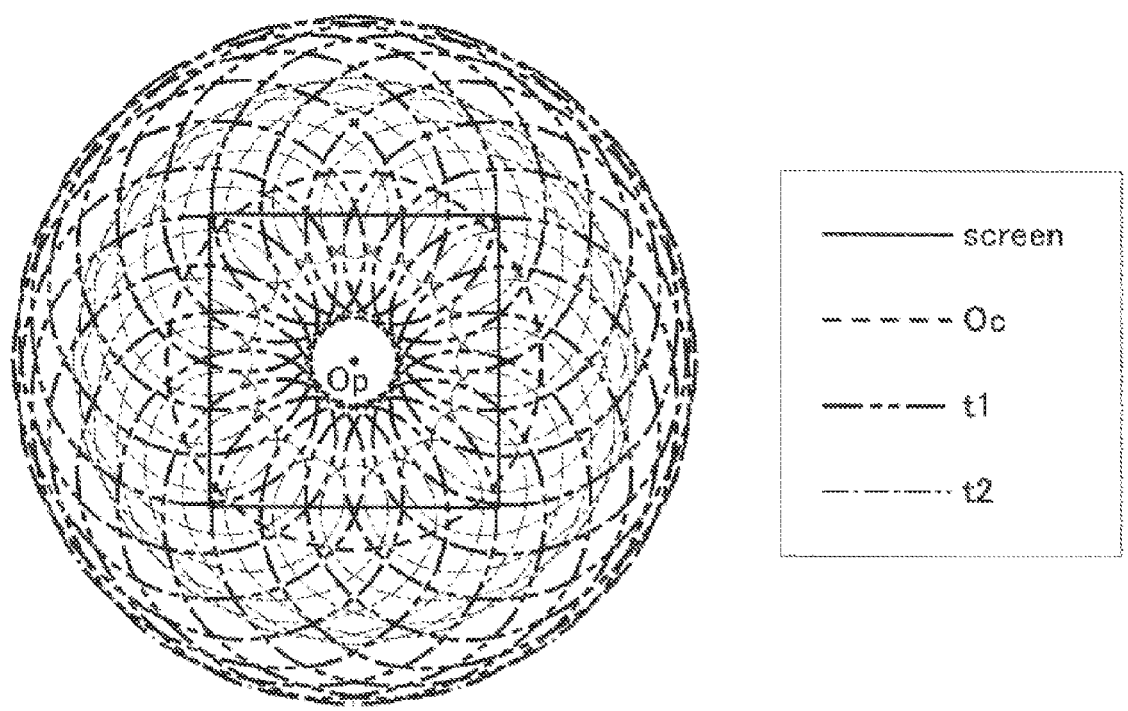
FIG. 4 shows a trajectory of a child revolution shaft and trajectories of first and second sponges.

Here, the trajectories of the first sponge 1 and the second sponge 2 on the screen 6 will be described in detail. In FIG. 4, for simplicity, the trajectory of the rotation axis t1 of the first sponge 1 represents the trajectory of the first sponge 1, and the trajectory of the rotation axis t2 of the second sponge 2 represents the trajectory of the second sponge 2. In addition, to facilitate understanding of the trajectories of the first sponge 1 and the second sponge 2, the trajectory of the child revolution axis Oc is also shown in FIG. 4.

As shown in FIG. 4, both the trajectories of the rotation axes t1, t2 of the first sponge 1 and the second sponge 2 swing in and out (make the child revolution) around the trajectory of the child revolution axis Oc making the parent revolution. Naturally, the trajectory of the child revolution axis Oc constitutes the circumference of the sponge parent revolution radius Ro, the swing width of the first sponge 1 is double the first child revolution radius r1, and the swing width of the second sponge 2 is double the second child revolution radius r2. In addition, the density (closeness) of the trajectories of the first sponge 1 and the second sponge 2 is proportional to the revolution speed ratio of the child revolution to the parent revolution ($\omega c/\omega p$). In other words, the trajectories of the first sponge 1 and the second sponge 2 are determined by the sponge parent revolution radius Ro, the first child revolution radius r1, the second child revolution radius r2, and the revolution speed ratio of the child revolution to the parent revolution ($\omega c/\omega p$). Furthermore, the distribution of the powder 7 adhering to the printing medium varies depending on the first contact diameter d1 and the second contact diameter d2.

The sponge parent revolution radius Ro may preferably be equal to or less than 140% of the distance from the parent revolution axis Op to the edge of the screen 6. Thus, the first sponge 1 and the second sponge 2 reach the vicinity of the parent revolution axis Op on the screen 6, such that the area of the screen 6 where the powder 7 is not rubbed in can be minimized. It may be preferable that the first child revolution radius r1 and the second child revolution radius r2 are different. Thus, the overlapping area between the trajectory of the first sponge 1 and the trajectory of the second sponge 2 is reduced, such that the powder 7 can be rubbed into the screen 6 to an extreme evenness. The second contact diameter/the second child revolution radius (d2/r2) may preferably be 70 to 120% of the first child revolution radius/the first contact diameter (r1/d1). Thus, the trajectories of the first sponge 1 and the second sponge 2 are not excessively sparse, such that the powder 7 can be rubbed into the screen 6 to an extreme evenness. The revolution speed ratio of the child revolution to the parent revolution ($\omega c/\omega p$) may preferably be 4.0 or greater. Thus, the trajectories of the first sponge 1 and the second sponge 2 are dense, that is, these trajectories are close to each other, such that the powder 7 can be rubbed into the screen 6 to an extreme evenness. It may be more preferable that the revolution speed ratio of the child revolution to the parent revolution ($\omega c/\omega p$) is not an integer. Thus, the first sponge 1 and the second sponge 2 do not return to the respective original positions after one parent revolution, such that the powder 7 can be rubbed into the screen 6 to an extreme evenness.

Figure 5:
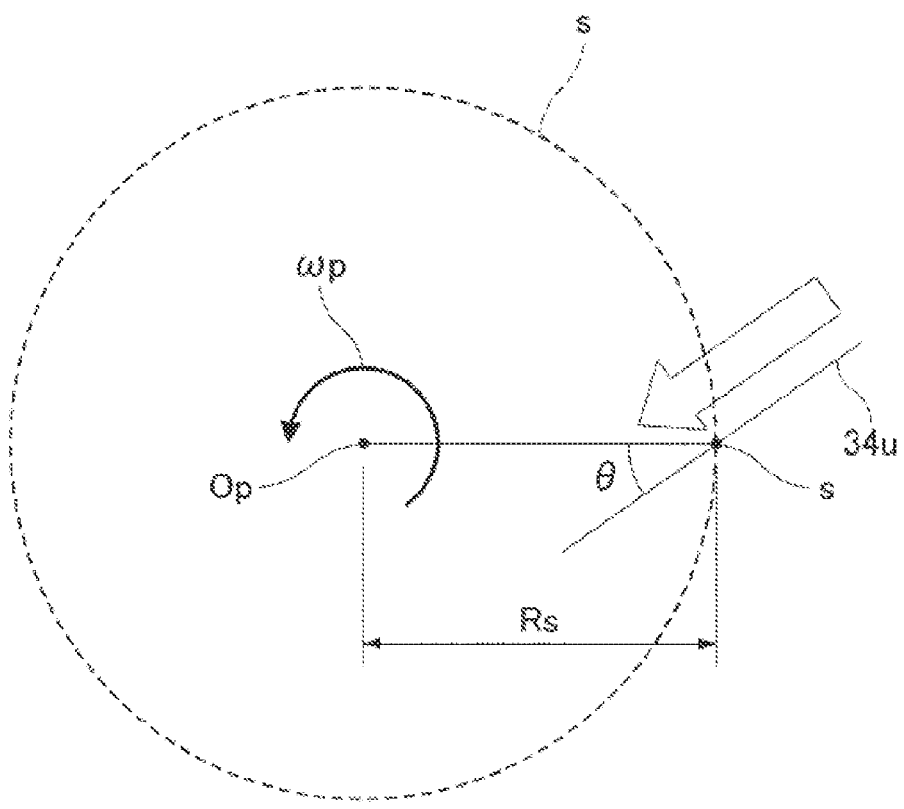
FIG. 5 shows arrangement of a scraper.

The scraper 34 is disposed at such a position that it can scrape the powder 7 close to the parent revolution axis Op on the screen 6 by the parent revolution. More specifically, as shown in FIG. 5, the angle θ formed on the screen 6 between the line of the scraper parent revolution radius Rs and the lower edge 34*u* of the scraper 34 (the contact line between the screen 6 and the scraper 34) is set at 40 to 70°. With the angle θ equal to or greater than 40°, the powder 7 can be smoothly scraped close to the parent revolution axis Op on the screen 6 by the parent revolution, that is, the powder 7 can be smoothly scraped to an area reachable to the first sponge 1 and the second sponge 2. Further, with the angle θ equal to or less than 70°, the powder 7 can be scraped from a larger area. In addition, the scraper 34 is disposed so as to extend to the outside of the trajectories of the first sponge 1 and the second sponge 2. Thus, even if the powder 7 is pushed to the outside of the trajectories by the first sponge 1 and the second sponge 2, the powder 7 is scraped to the inside of the trajectories by the scraper 34.

The operation of the electrostatic screen printer 10 will be hereinafter described.

First, a printing medium is placed on the pedestal, and the powder 7 is placed on the screen 6. Then, the parent revolution drive unit drives the parent revolution shaft 31 (that is, cause the parent revolution), the child revolution shaft 41, which is interlocked with the parent revolution shaft 31, is driven (that is, make the child revolution), and the first sponge 1 and the second sponge 2 rotate. As a result, the powder 7 is rubbed into the screen 6 to an extreme evenness. The portion of the powder 7 which has not been rubbed into the screen 6 is scraped by the scraper 34 to the area reachable to the first sponge 1 and the second sponge 2, and eventually rubbed into the screen 6 to an extreme evenness.

The powder 7 rubbed into the screen 6 is charged negatively by the direct current power supply and passes through the screen 6 to adhere by electrostatic induction to the printing medium charged positively via the pedestal.

As described above, in the electrostatic screen printer 10, the powder 7 is rubbed into the screen 6 to an extreme evenness, and therefore, it is possible to adhere the powder 7 to the printing medium to an extreme evenness.

Further, since the scraper 34 scrapes the powder 7 to the area reachable to the first sponge 1 and the second sponge 2, the powder 7 can be adhered to the printing medium without waste.

To explain the advantages of the electrostatic screen printer 10, the measurement results of Comparative Example and Examples 1 to 5 are shown in Table 1 and FIGS. 6 to 11. In Comparative Example, the sponge was manually moved such that the powder 7 was rubbed into the screen 6 and adhered to the printing medium, instead of using the electrostatic screen printer 10. The sponge used in Comparative Example was a rectangular parallelepiped having a size of 100 mm×50 mm in a plan view. On the other hand, in Examples 1 to 5, the powder 7 was adhered to the printing medium using the electrostatic screen printer 10. In the electrostatic screen printer 10 of Examples 1 to 5, the revolution speed ratio of the child revolution to the parent revolution ($\omega c/\omega p$) was 53/12, the sponge parent revolution radius Ro was 33 mm, the first child revolution radius r1 was 25 mm, the second child revolution radius r2 was 15 mm, the first contact diameter d1 was 28 mm, and the second contact diameter d2 was 36 mm.

In addition, all of Comparative Example and Examples 1 to 5 satisfied the following conditions.

(1) The screen 6 included a mesh net having a size of 70 mm square.

(2) A mask having a 50 mm square hole was placed on the printing medium constituted by aluminum foil.

(3) 0.7 g of powder was placed on the screen 6.

(4) The powder adhered and deposited on the printing medium was compressed at 0.25 GPa or 1.00 GPa to form a film.

(5) The film formed on the printing medium was divided into a lattice (10 mm square) having five rows and five columns, and the film thickness of the divisions were measured with a micrometer.

The measurement results of Comparative Example and Examples 1 to 5 are shown in Table 1 and FIGS. 6 to 11.

TABLE 1

| | Application Means | Forming Pressure [GPa] | Speed of Parent Revolution $\omega p$ [rpm] | Number of Feedings [Times] | Amount of Deposit [g] | Film Thickness | | | |
|---|---|---|---|---|---|---|---|---|---|
| | | | | | | Average [μm] | Max [μm] | Min [μm] | Standard Deviation [μm] |
| Comparative Example | Manual | 0.25 | — | — | 0.40 | 138 | 225 (+63%) | 70 (−50%) | 50.0 (49%) |
| Example 1 | Electrostatic | 0.25 | 30 | 1 | 0.33 | 104 | 130 (+25%) | 90 (−14%) | 10.1 (10%) |
| Example 2 | Screen | 0.25 | 15 | 1 | 0.34 | 108 | 135 (+25%) | 90 (−17%) | 12.4 (12%) |
| Example 3 | Printer 10 | 1.00 | 42 | 1 | 0.33 | 94 | 133 (+40%) | 73 (−23%) | 13.4 (14%) |
| Example 4 | | 0.25 | 30 | 2 | 0.33 | 107 | 128 (+20%) | 85 (−20%) | 11.4 (11%) |
| Example 5 | | 1.00 | 30 | 4 | 0.32 | 90 | 125 (+39%) | 80 (−11%) | 9.9 (11%) |

The percentages within the parentheses are relative to the averages set at 100%.

As shown in Table 1 and FIGS. 6 to 11, the film thicknesses of Examples 1 to 5 had a standard deviation about one-fifth of that of the film thickness of Comparative Example, indicating a higher evenness.

Embodiment 2

The electrostatic screen printer 10 according to Embodiment 2 of the present invention is fabricated by configuring the electrostatic screen printer 10 of Embodiment 1 such that the direction in which the first sponge 1 and the second sponge 2 rotate is opposite to the direction of the parent revolution and the child revolution.

Figure 12:
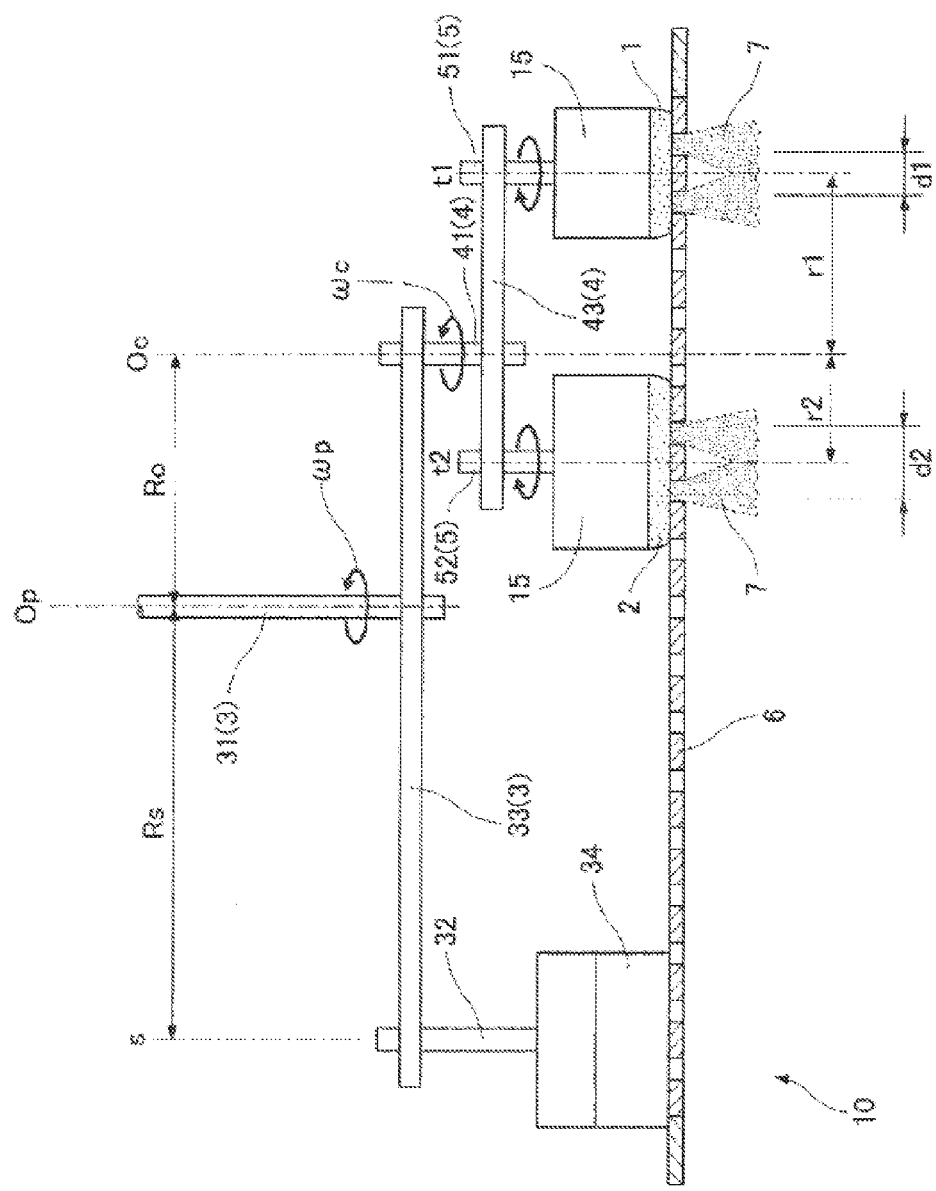
FIG. 12 is a schematic view of an electrostatic screen printer according to Embodiment 2 of the present invention.

As shown in FIG. 12, in the electrostatic screen printer 10 according to Embodiment 2 of the present invention, the rotation mechanism 5 is configured such that the rotation is reversely interlocked with the child revolution. More specifically, in the rotation mechanism 5 of Embodiment 2 of the present invention, for example, a reverse gear (not shown) is provided between the spur gear 46 and the rotation gear 55 of Embodiment 1 so as to mesh with these gears 46, 55. Since the rotation mechanism 5 makes the direction of the rotation opposite to that of the child revolution, the powder 7 scraped by the first sponge 1, the second sponge 2, and the scraper 34 are less likely to concentrate at the parent revolution axis Op.

As described above, in the electrostatic screen printer 10 according to Embodiment 2 of the present invention, the powder 7 is less likely to concentrate at the parent revolution axis Op, and therefore, the powder 7 can be adhered to the printing medium more evenly than in the electrostatic screen printer 10 according to Embodiment 1.

Embodiment 3

Figure 13:
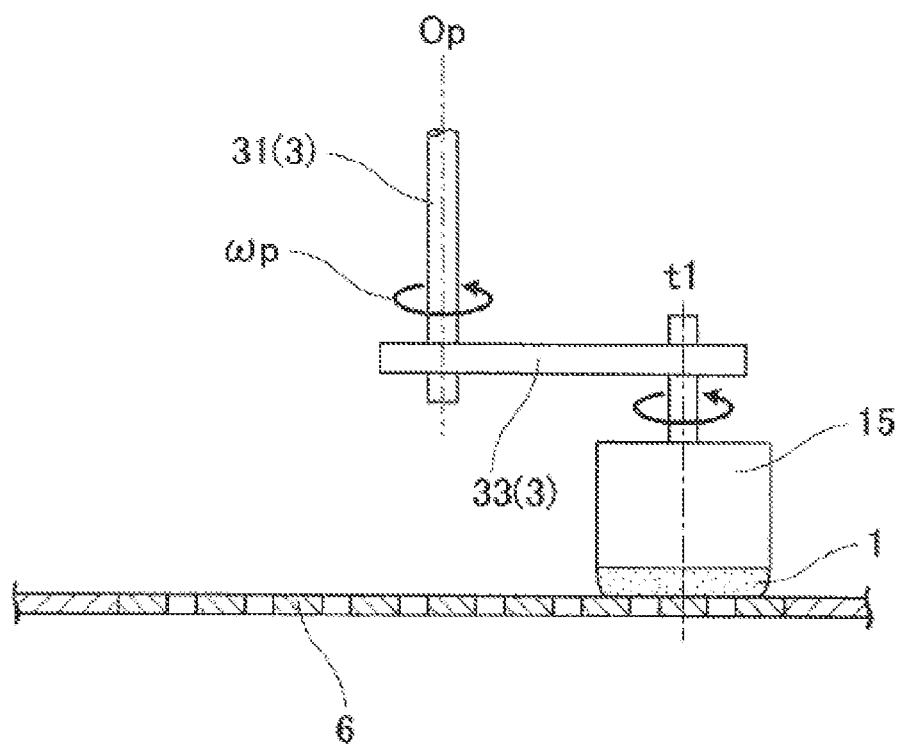
FIG. 13 is a schematic view of an electrostatic screen printer according to Embodiment 3 of the present invention.

As shown in FIG. 13, the electrostatic screen printer 10 according to Embodiment 3 of the present invention is fabricated by omitting the portions related to the child revolution, the second sponge 2, and the scraper 34 from the electrostatic screen printer 10 according to Embodiment 1, so as to have an extremely simple configuration.

The following description will be focused on the portions different from those in Embodiment 1. The same elements as in Embodiment 1 will be denoted by the same reference numerals and the description thereof will be omitted.

As shown in FIG. 13, the electrostatic screen printer 10 according to Embodiment 3 of the present invention includes, on one end of the parent revolution arm 33, the first sponge 1 and the rotation mechanism 5 for the portions related to the first sponge 1, instead of the child revolution mechanism 4 as in Embodiments 1 and 2. Therefore, the electrostatic screen printer 10 may have an extremely simple configuration, in which the powder 7 can be rubbed into the screen 6 more evenly by the revolution and the rotation of the first sponge 1.

As described above, in the electrostatic screen printer 10 according to Embodiment 3 of the present invention, the powder 7 is rubbed into the screen 6 move evenly, such that the powder 7 can be adhered to the printing medium more evenly, and the extremely simple configuration can lower the initial costs extremely.

Embodiment 4

Figure 14:
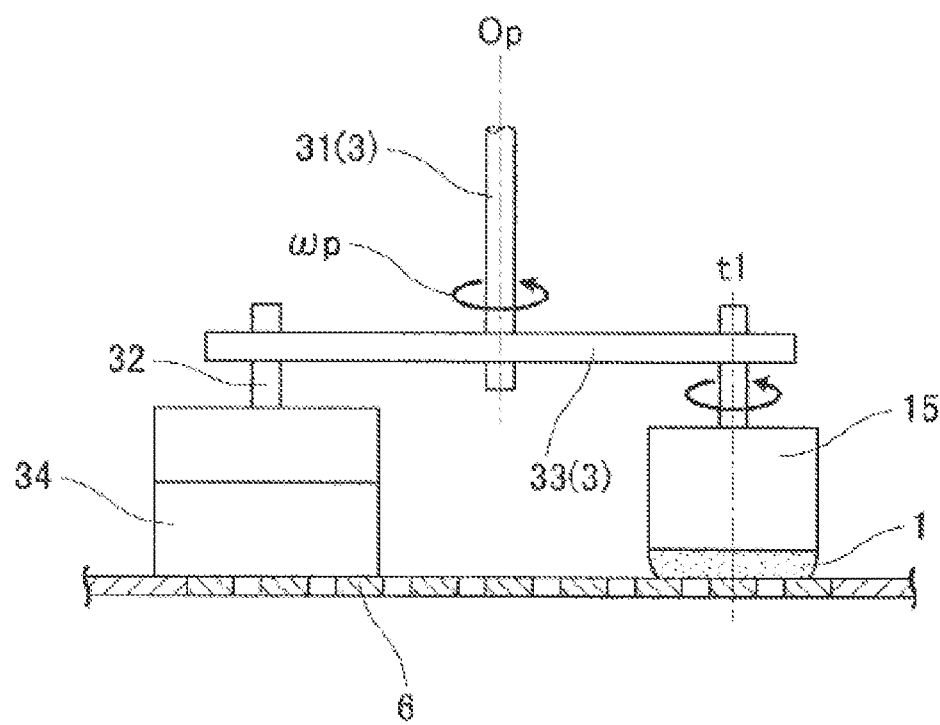
FIG. 14 is a schematic view of an electrostatic screen printer according to Embodiment 4 of the present invention.

As shown in FIG. 14, the electrostatic screen printer 10 according to Embodiment 4 of the present invention is fabricated by providing the electrostatic screen printer 10 according to Embodiment 3 with the rod 32 and the scraper 34 on the other end of the parent revolution arm 33. Therefore, the electrostatic screen printer 10 according to Embodiment 4 of the present invention has a sufficiently simple configuration, in which the powder 7 can be rubbed into the screen 6 more evenly by the revolution and the rotation of the first sponge 1. In addition, the scraper 34 scrapes the powder 7 to an area reachable to the first sponge 1.

As described above, in the electrostatic screen printer 10 according to Embodiment 4 of the present invention, the powder 7 is rubbed into the screen 6 move evenly, such that the powder 7 can be adhered to the printing medium more evenly, and the sufficiently simple configuration can lower the initial costs sufficiently.

Further, since the scraper 34 scrapes the powder 7 to the area reachable to the first sponge 1, the powder 7 can be adhered to the printing medium without waste.

Embodiment 5

Figure 15:
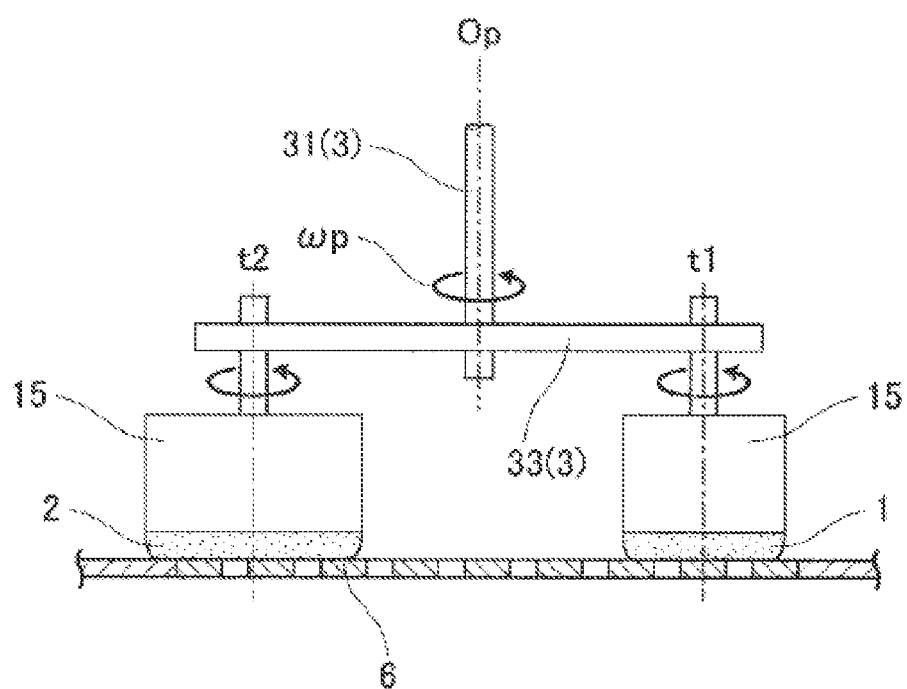
FIG. 15 is a schematic view of an electrostatic screen printer according to Embodiment 5 of the present invention.

As shown in FIG. 15, the electrostatic screen printer 10 according to Embodiment 5 of the present invention is fabricated by providing the electrostatic screen printer 10 according to Embodiment 4 with the second sponge 2 and the rotation mechanism 5 for the portions related to the second sponge 2 on the other end of the parent revolution arm 33, instead of the rod 32 and the scraper 34 as in Embodiment 4. Therefore, the electrostatic screen printer 10 according to Embodiment 5 of the present invention has a simple configuration, in which the powder 7 can be rubbed into the screen 6 to a high evenness by the revolution and the rotation of the first sponge 1 and the second sponge 2.

As described above, in the electrostatic screen printer 10 according to Embodiment 5 of the present invention, the powder 7 is rubbed into the screen 6 move evenly, such that the powder 7 can be adhered to the printing medium to a high evenness, and the simple configuration can lower the initial costs.

Embodiment 6

Figure 16:
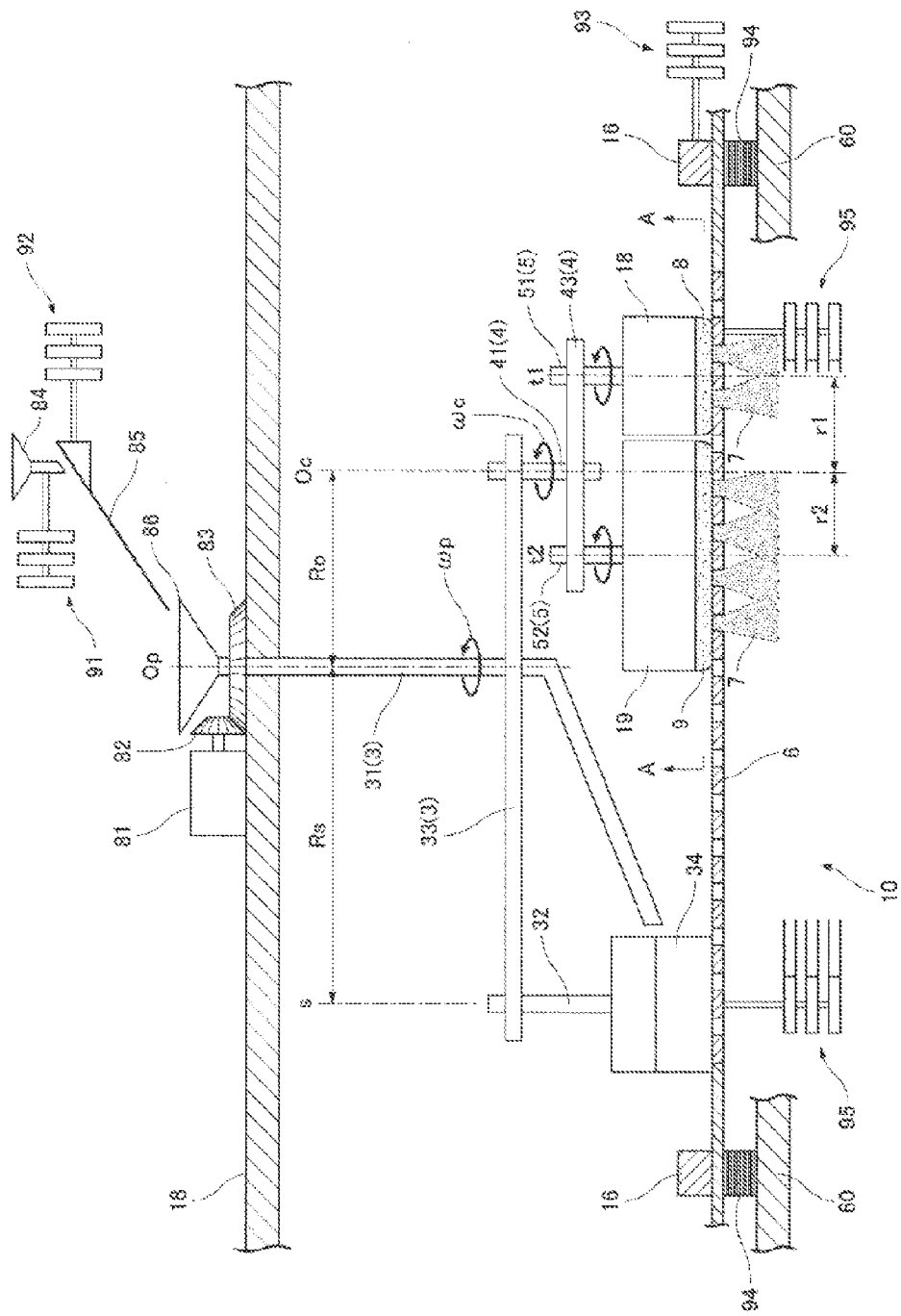
FIG. 16 is a schematic view of an electrostatic screen printer according to Embodiment 6 of the present invention.

As shown in FIG. 16, the electrostatic screen printer 10 according to Embodiment 6 of the present invention is fabricated by configuring the electrostatic screen printer 10 according to Embodiment 1 such that the disintegrated powder 7 is supplied to the scraper 34, the powder 7 is rubbed into the screen 6 much more evenly, and the screen 6 into which the powder 7 is rubbed is vibrated. The vibration herein includes intermittent or continuous shock motions.

The following description will be focused on the portions different from those in Embodiment 1. The same elements as in Embodiment 1 will be denoted by the same reference numerals and the description thereof will be omitted.

As shown in FIG. 16, the electrostatic screen printer 10 according to Embodiment 6 of the present invention is fabricated by adding, to the electrostatic screen printer 10 according to Embodiment 1, a powder feeding unit 84 to 86 for feeding the disintegrated powder 7 to the scraper 34, a first sponge 8, a second sponge 9, and elliptical columns 18, 19 for rubbing the powder 7 into the screen 6 much more evenly, and screen vibrating unit 93 to 95 for vibrating the screen 6 into which the powder 7 is rubbed.

The powder feeding unit 84 to 86 include a downstream hopper 86 extending from above the top plate 18 through the interior of the parent revolution shaft 31 and having a lower end thereof oriented toward the scraper 34, a material feeder 85 for feeding the powder 7 to the downstream hopper 86 from above, and an upstream hopper 84 for feeding the powder 7 to the material feeder 85 from above. Since the downstream hopper 86 rotates together with the parent revolution shaft 31, the downstream hopper 86 disintegrates the powder 7 passing therethrough by the centrifugal force and feed it to the scraper 34. The material feeder 85 and the upstream hopper 84 is configured to feed a predetermined amount of powder 7 to the downstream hopper 86, using vibration generating elements 92, 91 provided thereon. The powder 7 may preferably be fed continuously, or else it may preferably be fed intermittently at a rate of a plurality of times per one parent revolution.

The parent revolution shaft 31 through which the downstream hopper 86 extends is driven by the parent revolution drive unit 81 to 83. The parent revolution drive unit 81 to 83 include an electric motor 81 disposed on the top plate 18, a motor-side gear 82 connected to a shaft of the electric motor 81, and a shaft-side gear 83 connected to the parent revolution shaft 31. The motor-side gear 82 and the shaft-side gear 83 may be replaced with other elements such as a screw gear and a pulley as long as they transmit the rotation of the electric motor 81 to the parent revolution shaft 31.

Figure 17:
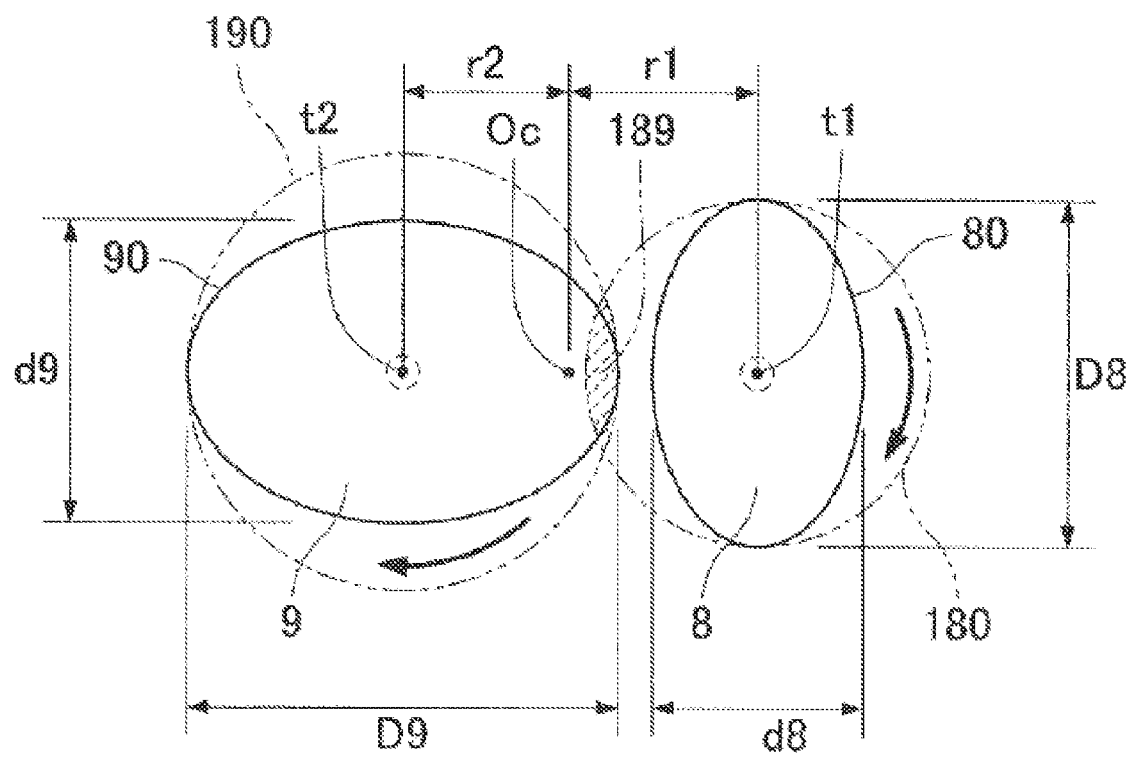
FIG. 17 is viewed along the arrow A-A in FIG. 16.
Figure 18:
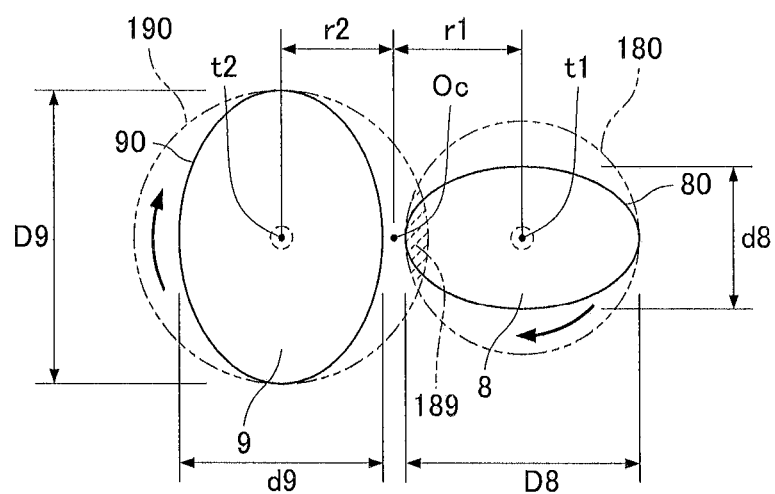
FIG. 18 shows rotation of the first sponge and the second sponge in FIG. 17 by 90°.

As shown in FIG. 17, the first sponge 8, the second sponge 9, and the elliptical columns 18, 19 are configured that the contact surface between the first sponge 8 and the screen 6 (hereinafter referred to as "the small contact surface 80") and the contact surface between the second sponge 9 and the screen 6 (hereinafter referred to as "the large contact surface 90") have ellipse shapes centered at the respective rotation axes t1, t2. The small contact surface 80 and the large contact surface 90 have ellipse shapes with major diameters D8, D9 and minor diameters d8, d9. In addition, for the small contact surface 80 and the large contact surface 90, the sum of the major diameters D8, D9 is greater than the sum of the first revolution radius r1 and the second revolution radius r2, and the sum of the major diameter D8 or D9 of one of the contact surfaces and the minor diameter d9 or d8 of the other is kept small. Furthermore, the first sponge 8 and the second sponge 9 rotate so as not to contact with each other. For example, as shown in FIGS. 17 and 18, when one of the contact surfaces orients its major diameter D8 or D9 toward the child revolution axis Oc, the other orients its minor diameter d9 or d8 toward the child revolution axis Oc. In other words, the first sponge 8, the second sponge 9, and the elliptical columns 18, 19 rotate such that the trajectories 180, 190 of the contact surfaces 80, 90 with the screen 6 overlap at the portion 189, and rotate so as not to contact with each other. As long as this configuration is maintained, the small contact surface 80 and the large contact surface 90 may have other shapes than an ellipse such as oblong, ovoid, or oval shapes.

As shown in FIG. 16, the screen vibrating unit 93 to 95 include an upper vibration generating element 93 provided on a screen frame 16, a vibration absorbing member 94 for vibratably supporting the screen 6 on a fixing base 60, and a lower vibration generating element 95 provided under the screen 6. The lower vibration generating element 95 is arranged circumferentially around Op in a plan view. The upper vibration generating element 93 and the vibration absorbing member 94 vibrate the screen 6 from the peripheral thereof, and the lower vibration generating element 95 vibrates the screen 6 from the lower portion thereof. It may also be possible that the screen vibrating unit 93 to 95 includes only the upper vibration generating element 93 and the vibration absorbing member 94 or includes only the lower vibration generating element 95.

As described above, in the electrostatic screen printer 10 according to Embodiment 6 of the present invention, the disintegrated powder 7 is fed to the scraper 34, the powder 7 is rubbed into the screen 6 much more evenly, and the screen 6 into which the powder 7 is rubbed is vibrated, so as to adhere the powder 7 to the printing medium much more evenly.

Embodiment 7

Figure 19:
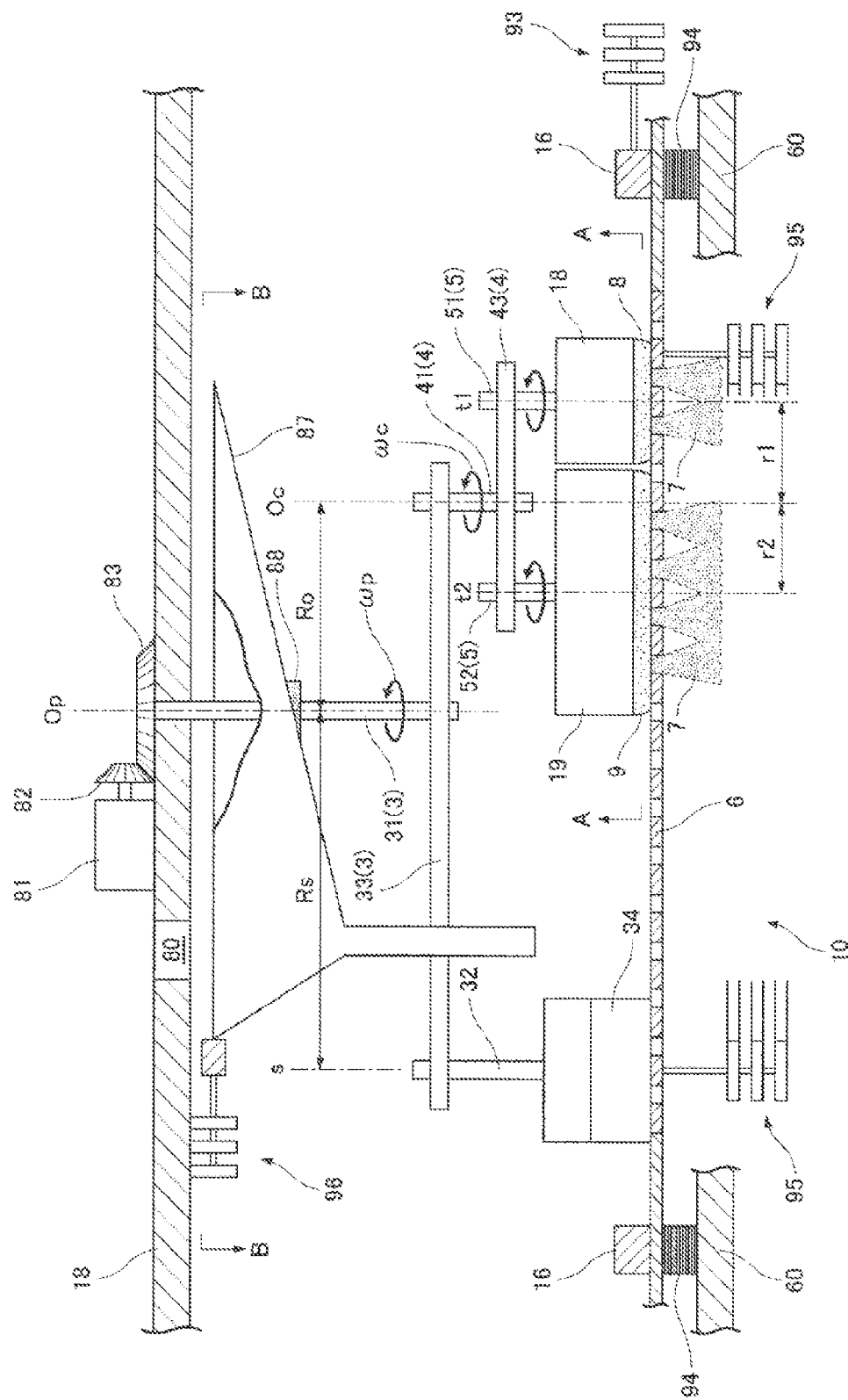
FIG. 19 is a schematic view of an electrostatic screen printer according to Embodiment 7 of the present invention.

As shown in FIG. 19, the electrostatic screen printer 10 according to Embodiment 7 of the present invention is fabricated by simplifying the powder feeding unit 87, 88 in the electrostatic screen printer 10 according to Embodiment 6.

The following description will be focused on the portions different from those in Embodiment 6. The same elements as in Embodiment 6 will be denoted by the same reference numerals and the description thereof will be omitted.

Figure 20:
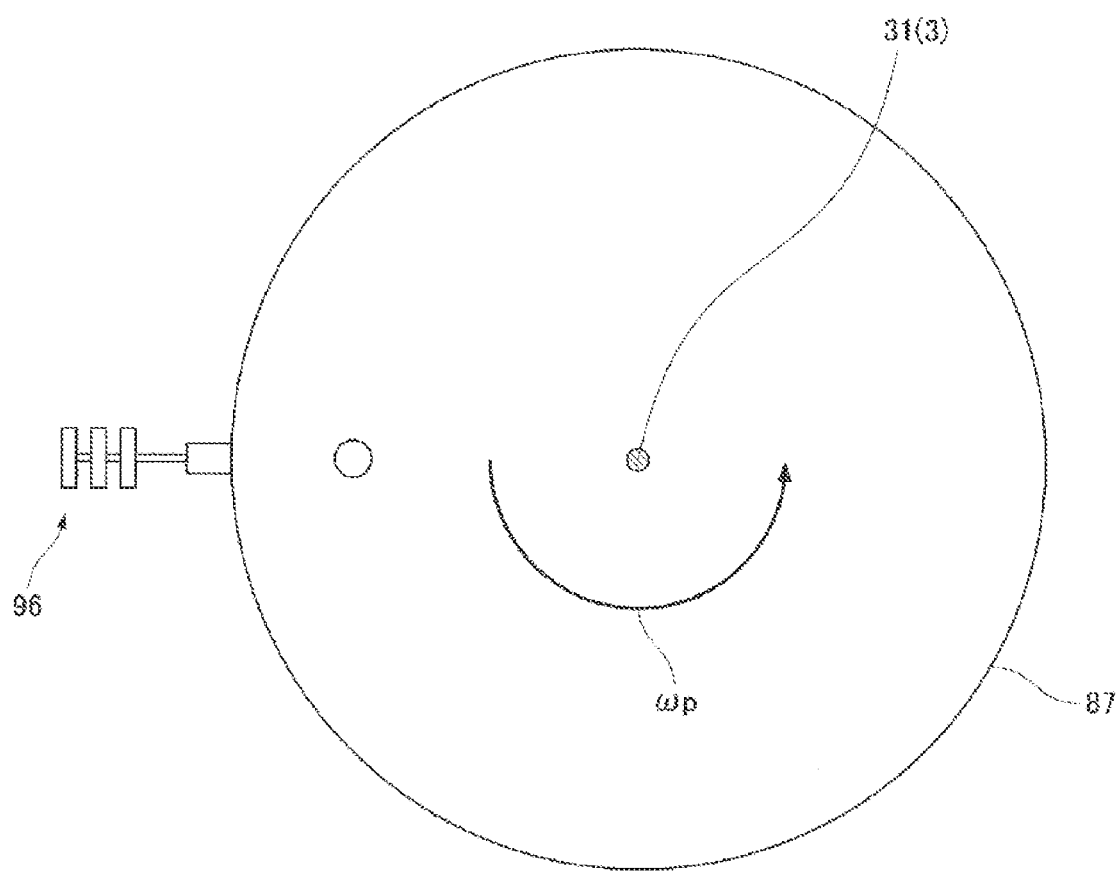
FIG. 20 is viewed along the arrow B-B in FIG. 19.

The powder feeding unit 87, 88 in the electrostatic screen printer 10 according to Embodiment 7 includes a large hopper 87 for feeding to the scraper 34 the powder 7 put in through the powder inlet 80 formed in the top plate 18, and a fixture 88 for fixing the large hopper 87 to the parent revolution shaft 31. As shown in FIG. 20, the large hopper 87 rotates together with the parent revolution shaft 31 and is vibrated by a vibration generating element 96 provided on the lower surface of the top plate 18.

As shown in FIG. 19, the powder 7 put in through the powder inlet 80 formed in the top plate 18 is disintegrated by falling into the large hopper 87 which is rotating and vibrating and is fed to the scraper 34.

As described above, the electrostatic screen printer 10 according to Embodiment 7 can be simpler than that of Embodiment 6.

Embodiment 8

Figure 21:
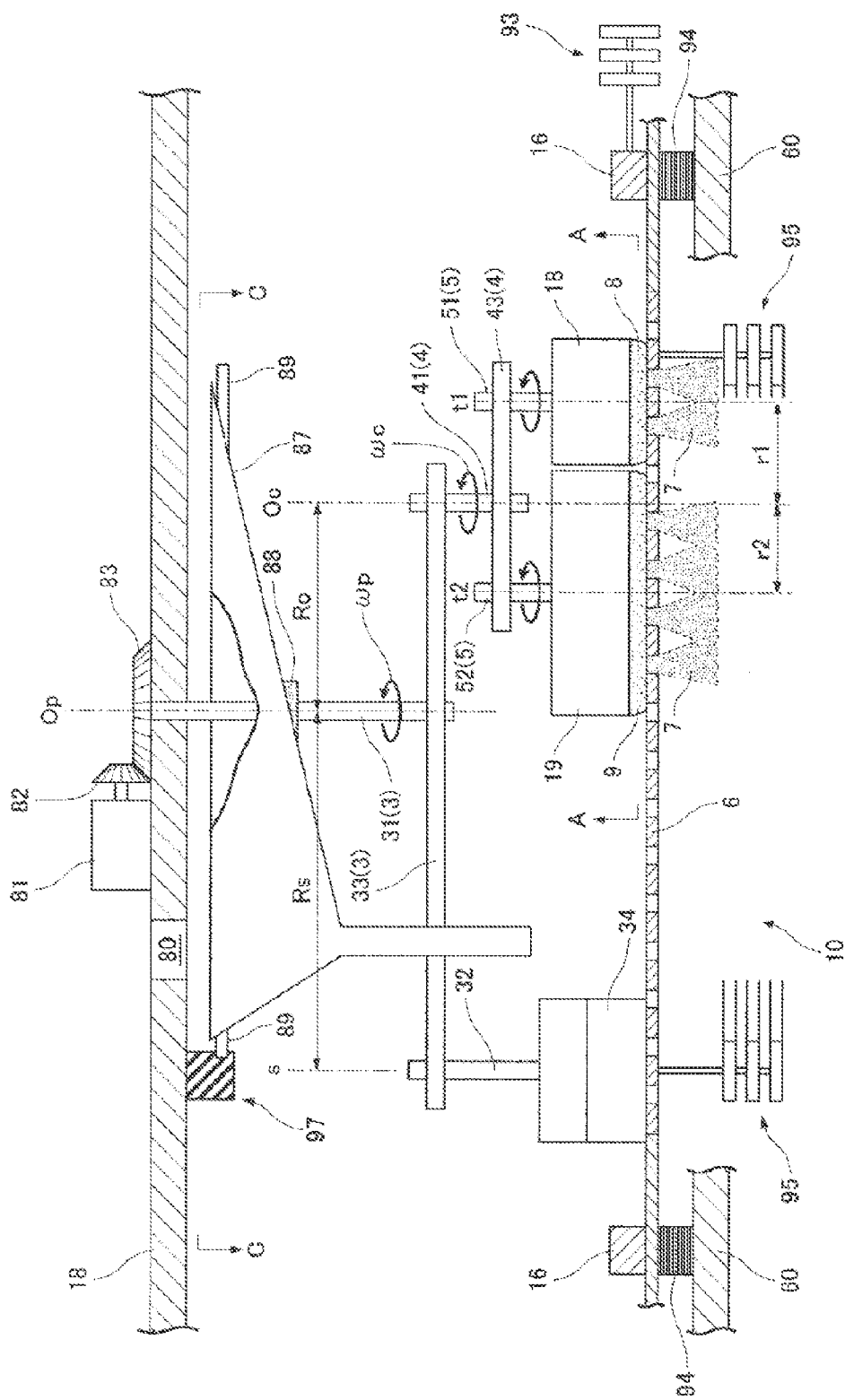
FIG. 21 is a schematic view of an electrostatic screen printer according to Embodiment 8 of the present invention.

As shown in FIG. 21, the electrostatic screen printer 10 according to Embodiment 8 of the present invention is fabricated by simplifying the configuration to vibrate the large hopper 87 in the electrostatic screen printer 10 according to Embodiment 7.

The following description will be focused on the portions different from those in Embodiment 7. The same elements as in Embodiment 7 will be denoted by the same reference numerals and the description thereof will be omitted.

Figure 22:
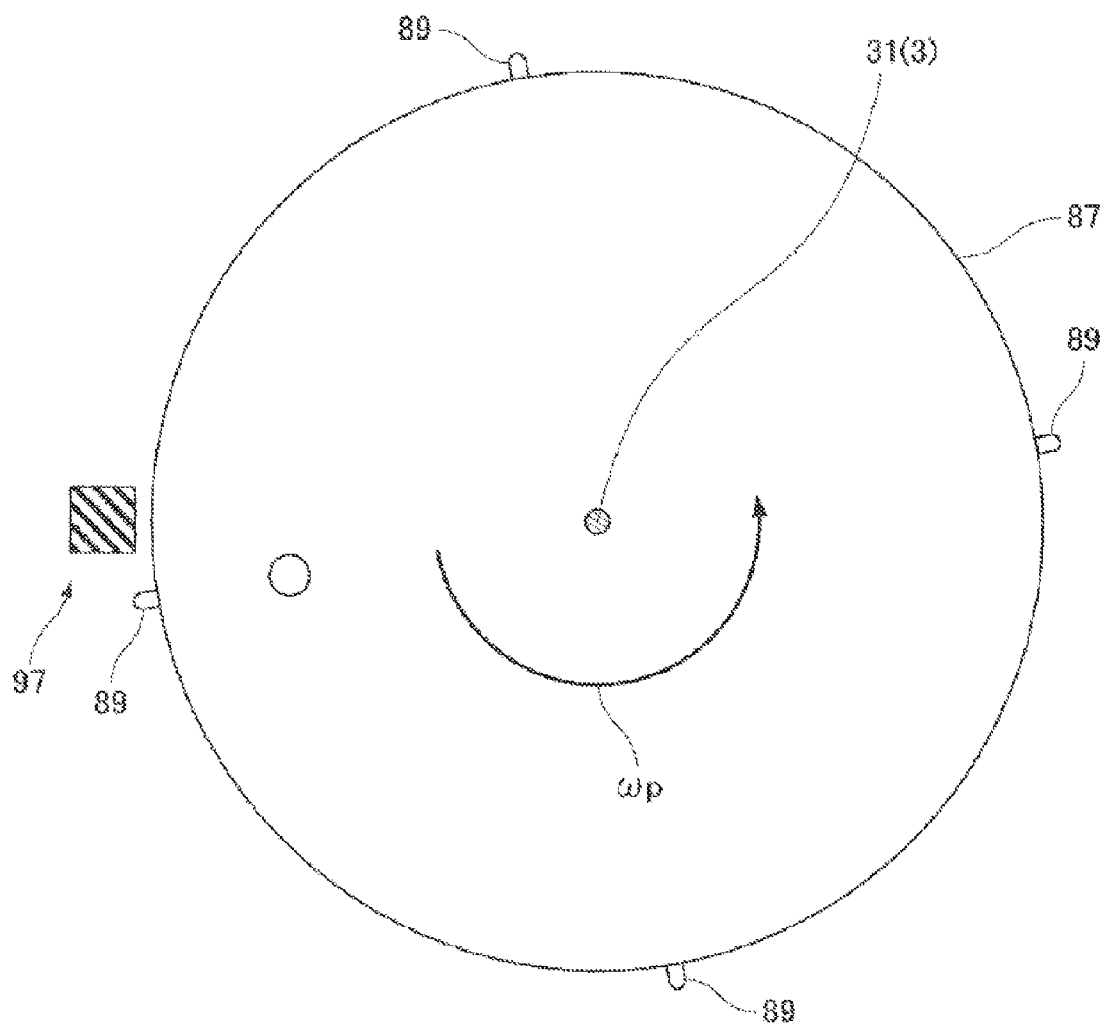
FIG. 22 is viewed along the arrow C-C in FIG. 21.

The large hopper 87 in the electrostatic screen printer 10 according to Embodiment 8 is vibrated not by the vibration generating element 96 shown in FIGS. 19 and 20, but by a plurality of projections 89 provided on the outer edge of the large hopper 87 at a constant pitch in a plan view and a collision member 97 provided on the lower surface of the top plate 18 and configured to collide with the projections 89 by rotation of the large hopper 87 as shown in FIGS. 21 and 22. Either or both of the projections 89 and the collision member 97 may be made of an elastic material (such as rubber or sponge), such that the large hopper 87 can be vibrated properly by the collision without hindering the rotation of the large hopper 87 and the parent revolution shaft 31.

As described above, the electrostatic screen printer 10 according to Embodiment 8 can be simpler than that of Embodiment 7.

In Embodiments 1 to 8, the first sponge (and the second sponge) has been described as an example of the rubbing member, but the present invention is not limited thereto. That is, the rubbing member is required only to rub the powder 7 into the screen 6, and more than two rubbing members may be included. As another example, the rubbing member may include an elastic member made of a sponge or carpet and a wear-resistant layer such as a nonwoven fabric covering the elastic member and capable of contacting with the screen 6.

Further, in Embodiment 5, the scraper 34 has been described as provided on the parent revolution mechanism 3, but it may also be possible that the scraper 34 is provided on the child revolution mechanism 4.

Furthermore, in Embodiments 1 to 8, the screen 6 has been simply described as made of a mesh net, but it may be also possible that the screen 6 has a form having less tendency to pass the powder 7 in a region where the powder 7 tends to be concentrated.

In addition, in Embodiments 1 to 5, it has been described that the sponges 1, 2 are moved on the fixed screen 6 so as to rub the powder 7 into the screen 6, but the screen 6 may also be moved.

If the contact surfaces between the sponges 1, 2 and the screen 6 are circular, the rotation axes t1, t2 of the sponges 1, 2 may preferably be eccentric such that the powder 7 can be adhered to the printing medium more evenly. If the contact surfaces 80, 90 between the sponges 8, 9 and the screen 6 are elliptical as in Embodiments 6 to 8, the same advantages can be produced as with the sponges 1, 2 having circular contact surfaces and eccentric axes t1, t2.

Further, a mesh net having an appropriate coarseness may be selected for screen 6 depending on the desired amount of the powder 7 to be adhered to and deposited on the printing medium.

The sponges 1, 2 may be provided with a brush for sweeping the outer periphery of the contact diameters d1, d2 on the screen 6, such that the powder 7 can be adhered to the printing medium more evenly.

What is claimed is:

1. An electrostatic screen printer comprising:
   an electrically conductive screen arranged in non-contact with a printing medium;
   at least one rubbing member configured to rub a powder into the screen;
   a direct current power source configured to apply a voltage to the printing medium and the powder, the powder rubbed into the screen being adhered to the printing medium by electrostatic induction;
   a rotation mechanism configured to rotate the at least one rubbing member, the rotation mechanism comprising a first rotation shaft providing a rotation axis of the at least one rubbing member such that the at least one rubbing member is configured to rotate about the rotation axis on the first shaft; and
   a revolution mechanism configured to revolve the at least one rubbing member, the revolution mechanism comprising a revolution shaft providing a revolution axis of the at least one rubbing member and a revolution arm connected to the revolution shaft, wherein the at least one rubbing member is mounted to the revolution arm such that the at least one rubbing member is configured to revolve about the revolution axis;
   wherein the rotation axis and the revolution axis are parallel to and spaced apart from one another.

2. The electrostatic screen printer of claim 1, wherein
   a scraper is provided on the revolution mechanism so as to be interlocked with the revolution of the at least one rubbing member, and
   the scraper is arranged so as to scrape the powder on the screen toward an axis of the revolution because of the interlocking.

3. The electrostatic screen printer of claim 2 further comprising a powder feeding unit configured to feed to the scraper the powder to be rubbed into the screen.

4. The electrostatic screen printer of claim 1, wherein
   the at least one rubbing member comprises a plurality of rubbing members, and
   the distance from an axis of the revolution of the plurality of rubbing members to an axis of the rotation of each of the plurality of rubbing members is different.

5. The electrostatic screen printer of claim 4, wherein the plurality of rubbing members are configured to rotate such that trajectories of contact surfaces thereof with the screen overlap with each other, and rotate so as not to contact with each other.

6. The electrostatic screen printer of claim 1, wherein
   the revolution of the at least one rubbing member includes two stages, the revolution mechanism being configured to operate in a parent revolution stage and a child revolution stage, and
   a revolution speed ratio of the child revolution stage to the parent revolution stage is 4.0 or greater.

7. The electrostatic screen printer of claim 1, wherein the rotation mechanism is configured to rotate the at least one rubbing member in a direction opposite to a direction of the revolution.

8. The electrostatic screen printer of claim 1 where the at least one rubbing member includes an elastic member and a wear-resistant layer covering the elastic member and capable of contacting with the screen.

9. The electrostatic screen printer of claim 1 further comprising a screen vibrating unit configured to vibrate the screen.

* * * * *